(12) United States Patent
Mandic

(10) Patent No.: US 9,348,849 B1
(45) Date of Patent: May 24, 2016

(54) BACKUP CLIENT ZERO-MANAGEMENT

(71) Applicant: EMC Corporation, Hopkinton, MA (US)

(72) Inventor: Vladimir Mandic, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 214 days.

(21) Appl. No.: 14/138,538

(22) Filed: Dec. 23, 2013

(51) Int. Cl.
*G06F 17/30* (2006.01)
*G06F 11/14* (2006.01)
*H04L 29/08* (2006.01)

(52) U.S. Cl.
CPC ...... *G06F 17/30289* (2013.01); *G06F 11/1464* (2013.01); *H04L 67/26* (2013.01)

(58) Field of Classification Search
None
See application file for complete search history.

(56) References Cited

U.S. PATENT DOCUMENTS

| | | | | |
|---|---|---|---|---|
| 5,421,009 A * | 5/1995 | Platt | ............... | G06F 8/64 709/219 |
| 5,805,897 A * | 9/1998 | Glowny | ............... | G06F 8/61 709/221 |
| 5,974,258 A * | 10/1999 | Ferri | ............... | G06F 8/61 709/221 |
| 6,816,964 B1 * | 11/2004 | Suzuki | ............... | G06F 9/4416 709/232 |
| 7,350,149 B1 * | 3/2008 | Franceschelli, Jr. | .. | G06F 9/4443 709/203 |
| 7,881,745 B1 * | 2/2011 | Rao | ............... | G06F 8/65 455/414.1 |
| 2003/0221189 A1 * | 11/2003 | Birum | ............... | G06F 8/65 717/170 |
| 2004/0221024 A1 * | 11/2004 | Yamada | ............... | G06F 8/65 709/222 |
| 2005/0066324 A1 * | 3/2005 | Delgado | ............... | G06F 8/61 717/170 |
| 2006/0224850 A1 * | 10/2006 | Yamamoto | ............... | G06F 3/0625 711/170 |
| 2007/0043833 A1 * | 2/2007 | Lu | ............... | H04L 67/34 709/219 |
| 2007/0203957 A1 * | 8/2007 | Desai | ............... | G06F 21/31 |
| 2009/0158272 A1 * | 6/2009 | El-Assir | ............... | G06F 8/71 717/177 |
| 2010/0198937 A1 * | 8/2010 | Schletz | ............... | G06F 8/60 709/217 |
| 2010/0293541 A1 * | 11/2010 | Pall | ............... | G06F 8/61 717/178 |
| 2011/0093743 A1 * | 4/2011 | Arcese | ............... | G06F 8/61 714/18 |
| 2011/0302280 A1 * | 12/2011 | McJilton | ............... | G06F 8/61 709/220 |
| 2013/0038425 A1 * | 2/2013 | Sugiyama | ............... | H04L 63/168 340/5.81 |
| 2013/0262374 A1 * | 10/2013 | Helliker | ............... | G06F 11/1458 707/609 |
| 2014/0173692 A1 * | 6/2014 | Srinivasan | ............... | G06F 21/35 726/4 |

* cited by examiner

*Primary Examiner* — Robert Beausoliel, Jr.
*Assistant Examiner* — Nirav K Khakhar
(74) *Attorney, Agent, or Firm* — Van Pelt, Yi & James LLP

(57) ABSTRACT

The system for backup client management comprises an input interface and a processor. The input interface is configured to receive an indication of a client system. The processor is configured to provide an indication to the client system of authentication for remote command execution; provide a command to the client system to retrieve an installer; provide a command to the client system to execute the installer; and provide a backup command to the client system to execute a backup client agent.

20 Claims, 2 Drawing Sheets

BACKUP CLIENT ZERO-MANAGEMENT

BACKGROUND OF THE INVENTION

A major task in a backup environment is installation and maintenance of software on client systems. System users cannot be relied on to install the appropriate backup software and keep its version current.

BRIEF DESCRIPTION OF THE DRAWINGS

Various embodiments of the invention are disclosed in the following detailed description and the accompanying drawings.

DETAILED DESCRIPTION

Figure 1:
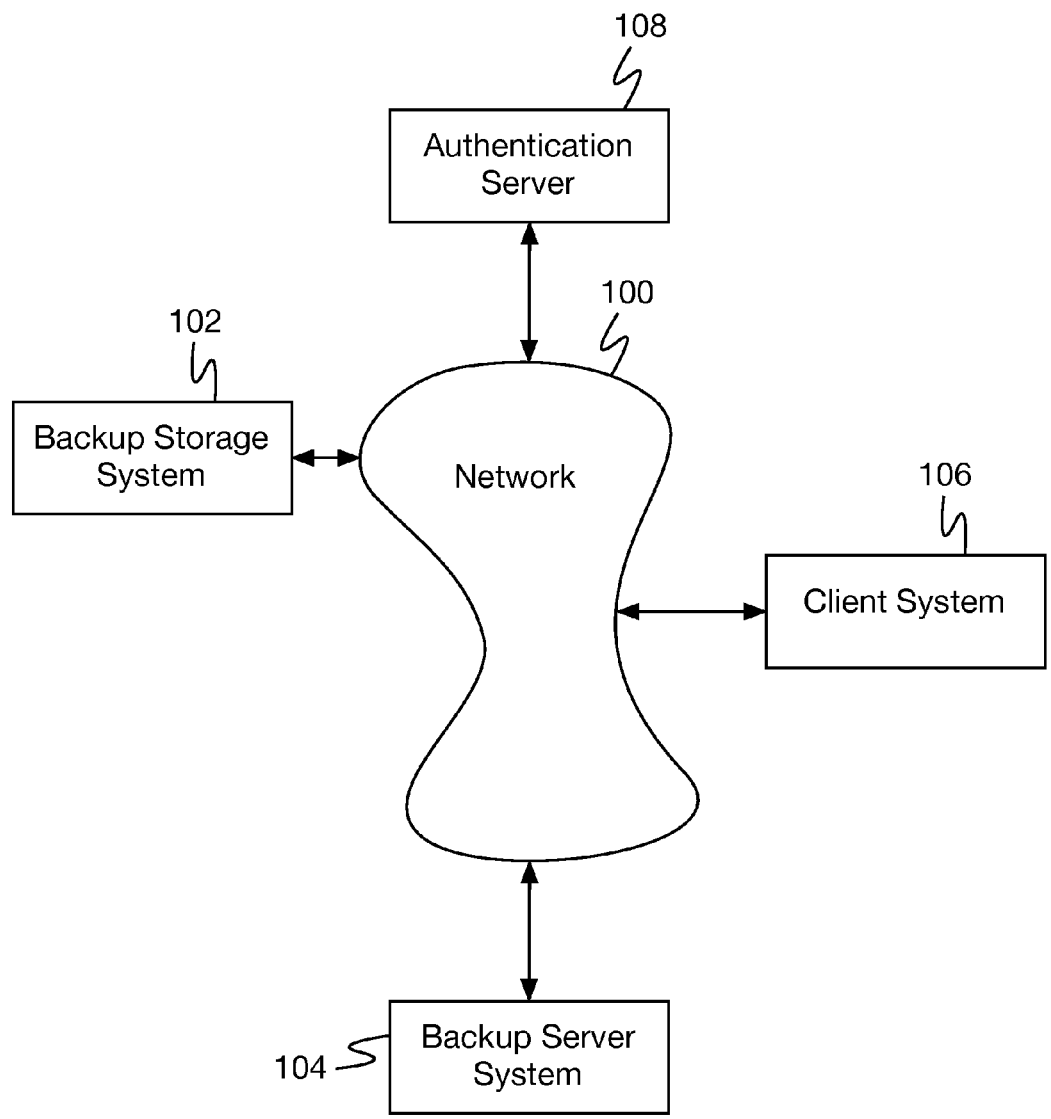
FIG. 1 is a block diagram illustrating an embodiment of a system for backup client management.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for backup client management is disclosed. The system for backup client management comprises an input interface and a processor. The input interface is configured to receive an indication of a client system. The processor is configured to provide an indication to the client system of authentication for remote command execution; provide a command to the client system to retrieve an installer; provide a command to the client system to execute the installer; and provide a backup command to the client system to execute a backup client agent. The system for backup client management additionally comprises a memory coupled to the processor and configured to provide the processor with instructions.

In some embodiments, remote management software (e.g., Windows™ Management Instrumentation, e.g., WMI) is used by a backup server system to issue commands on a client system. Rather than relying on the user of a client system to install and upgrade backup software, the system administrator is able to perform the actions directly. Client backup software packages (e.g., installers, backup agents, are placed in a known location on a backup server system, and commands are issued by the backup server via the remote management software to download, store (e.g., in an accessible local storage—for example, a disk, a buffer, a memory, etc.), install, and run the software. The backup administrator determines whether the software needs to be installed (e.g., if it is already installed and if the version installed is the appropriate version) and indicates to install the software if necessary. The backup administrator then can indicate for the client system to issue backup commands (e.g., commands issued to a backup agent running on a backup client—for example, start backup, schedule backup, show backup, start recovery, schedule recovery, show recovery, show available backups for recovery, show backup software version, etc.).

FIG. 1 is a block diagram illustrating an embodiment of a system for backup client management. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. In the example shown, client system 106 comprises a client system (e.g., a computing system for operation by a user). In some embodiments, client system 106 comprises a system accessed by a user directly (e.g., the user is in proximity with client system 106). In some embodiments, client system 106 comprises a system accessed by a user remotely (e.g., the user is not in proximity with client system 106, and accesses client system 106 via network 100 and a separate user system). Client system 106 comprises a system running enterprise software (e.g., business software for creating data, storing data, transmitting data, receiving data, etc.). In some embodiments, client system 106 comprises a system for storing data on a backup system or retrieving stored data from a backup system. In various embodiments, there are 1, 4, 17, 22, 1459, or any other appropriate number of client systems communicating with network 100. Backup storage system 102 comprises a computer system for backing up data. Backup system 102 backs up data stored on client system 106. In various embodiments, backup system 102 performs full backups of the data on client system 106 (e.g., makes complete copies of the data), performs incremental backups of the data on client system 106 (e.g., makes copies of data modified since the last backup), performs a combination of full and incremental backups of the data on client system 106, or performs any other appropriate kind of backup. In some embodiments, data stored on backup system 102 comprises deduplicated backup data (e.g., data is stored in such a way that multiple copies of the same data are only stored a single time). In some embodiments, deduplicated backup data is segmented (e.g., broken into chunks which can then be compared to determine duplicate data). In some embodiments, deduplicated backup data is segmented using a hash function (e.g., a hash function is used to determine where to divide data into segments). In various embodiments, there are 1, 2, 7, 12, 45, 138, or any other appropriate number of backup storage systems communicating with network 100. Backup server system 104 comprises a server system for controlling backup storage system 102 and client system 106. Authentication server 108 comprises a server for authenticating users and/or trusted systems. In some embodiments, authentication server 108 comprises a server for authenticating backup administrators. In some embodiments, authentication server 108 receives authentication information (e.g., a username and password) from a user (e.g., a client system user, a backup administrator, etc.) and confirms the user identity. In some embodiments, authentication server 108 provides an indication of authentication (e.g., an authentication ticket) in response to receiving and confirming authentication information. In some embodiments, backup server system 104 is a trusted system for client system 106, where the backup server system 104 is able to run commands locally on client system 106 (e.g., a command to retrieve a file on the backup server system, run the file—for example, an installation program, issue commands for the installed program—for example, run a client backup process to backup, to recover, etc., upgrade an installed program, etc.).

Figure 2:
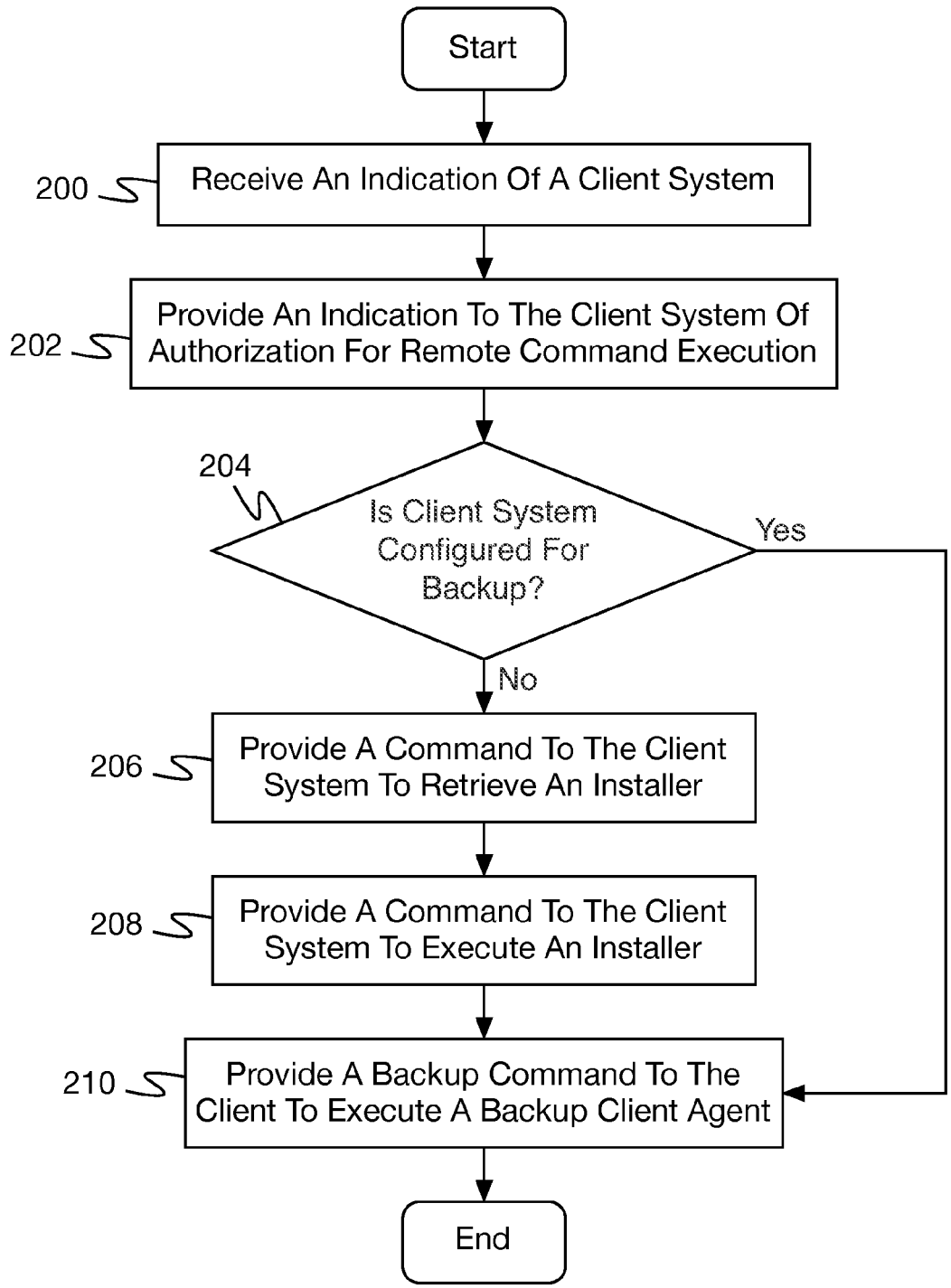
FIG. 2 is a flow diagram illustrating an embodiment of a process for backup client management.

FIG. 2 is a flow diagram illustrating an embodiment of a process for backup client management. In some embodiments, the process of FIG. 2 is executed by a backup server (e.g., backup server system 104 of FIG. 1). In some embodiments, the backup server executing the process of FIG. 2 is controlled by a backup administrator issuing commands to the backup server. In some embodiments, the backup server executing the process of FIG. 2 is controlled by predetermined list of commands (e.g., a script). In the example shown, in 200, an indication of a client system is received. In various embodiments, an indication of a client system comprises a client system name, a client system identifier, a client system address, or any other appropriate indication of a client system. In various embodiments, an indication of a client system is received from the client system, is read from a list of client systems, is received from a backup storage server, or is received from any other appropriate location. In 202, an indication is provided to the client system of authorization for remote command execution. In various embodiments, an indication of authorization for remote command execution comprises an indication of authentication received from an authentication server, a username and password, or any other appropriate indication of authorization. In some embodiments, remote command execution comprises WMI. In various embodiments, authorization for remote command execution comprises authorization via Kerberos, via Windows NT LAN Manager (e.g., NTLM), or via any other appropriate authentication protocol. In 204, it is determined whether the client system is configured for backup. In some embodiments, a client system configured for backup comprises a client system with backup client agent software installed. In various embodiments, determining if the client system is configured for backup comprises querying the client system, checking a list of configured client systems, querying a backup storage system, or determining in any other appropriate way. In some embodiments, determining whether a client system is configured for backup comprises determining whether to install a backup client agent. In some embodiments, determining if the client system is configured for backup comprises determining if the client system has an appropriate version of the backup client agent installed. In some embodiments, determining if the client system has an appropriate version of the backup client agent comprises determining the version of the backup client installed on the client system (e.g., by querying the client system, checking a list, etc.) and comparing the version to an appropriate version of the backup client agent (e.g., the most recent version, the most recent stable version, etc.). In some embodiments, in the event it is determined that the client system does not have an appropriate version of the backup client agent installed, it is determined that the client system is not configured for backup. In the event it is determined in 204 that the client system is configured for backup, control passes to 210. In the event it is determined in 204 that the client system is not configured for backup, control passes to 206.

In 206, a command is provided to the client system to retrieve an installer. In some embodiments, the command is provided by remote command execution. In some embodiments, the installer is stored on the backup server and retrieved by the client system. In some embodiments, the installer is stored on a hidden CIFS (e.g., common internet file system) share on the backup server. In some embodiments, the installer comprises an installer for a backup client agent (e.g., a software program that, when executed, installs a backup client agent on the client system). In some embodiments, the installer retrieves the backup client agent (e.g., from the backup server). The client system then executes the command to retrieve the installer. In 208, a command is provided to the client system to execute the installer. The client system then executes the installer (e.g., installing the backup client agent). In some embodiments, once the client system has executed the installer it is considered to be configured. In some embodiments, installing the backup client agent additionally comprises creating registry keys on the client system. In 210, a backup command is provided to the client to execute a backup client agent. In some embodiments, executing a backup client agent comprises starting a backup process. In some embodiments, a command is provided to the client to list a set of available backup commands, and a backup command is selected from the set of backup commands to be provided to the client to execute the backup agent. In some embodiments, a command is provided to the client to disconnect from the backup server (e.g., after the backup process is completed the connection between the client system and the backup server is shut down). In various embodiments, a backup command comprises: backup a file, backup a set of files, schedule a backup, recover a file, recover a set of files, schedule a recovery, show a stored contents of a backup, show a schedule of backups, show a stored set of backups, etc.).

In some embodiments, Windows Operating System (OS) provides solid foundation for remote execution using Windows Management Instrumentation (WMI) framework. By using WMI, a process can be remotely executed thus removing the need for dedicated backup agent listener. Requirements are that both initiator (e.g., a NetWorker (NW) server system) and target (e.g., a Networker client system) are running Windows OS and are part of the same trusted environment (e.g., an Active Directory). This is not a replacement for a traditional NW client installation, but is intended to augment existing solutions by providing zero-management to newly added clients. If a NW client is already installed and nsrexecd service is running, the connection workflow remains as-is. But if a connection from NW server to nsrexecd service on client fails, NW server can attempt an alternative method. The actual behavior of NW client is not expected to change with the exception that nsrexecd service should run as process—it is started via a remote WMI call and shutdown at the end of the backup. There are multiple options on actual hosting of binaries:

1. Remote execute NW process using WMI.
   NW binaries can be presented over a universal naming convention (UNC) path presented by NW server 2. Push NW client package and use WMI remotely install it.

Workflow#1

A first step is to enable a client access to NW binaries—without access to executables, a remote process cannot be started. This can be done by creating a hidden CIFS share on a NW server that exposes an unpacked version of a NW client. As a result, a client can execute a binary that is hosted on an UNC path without ever being locally present on the client.

A second step is to perform a creation of registry keys using WMI required by a NW client on the remote system. At minimum, this would include a (fake) path to the root of a NW client installation on the system, which should be used by nsrexecd to create and maintain client-side res/nsrladb database.

A third step is actual remote process execution of nsrexecd. Process execution is done using WMI method Win32_Process.Create( ). Note that special considerations must be done to assign required privileges for backup such as SE_BACKUP_PRIVILEGE.

At that time, control workflow returns to an existing NW workflow—NW server contacts nsrexecd on the client and requests execution of tasks such as probe (savefs) and actual backup (save).

Upon completion of the backup, the control workflow must include WMI call for a nsrexecd process shutdown to avoid unnecessary open network connections (since nsrexecd is executed over the UNC path).

Similar workflow should be implemented as part of recover workflow. There are no actual changes to backup or recover compared to traditional methods.

Since this method relies on remote execution over UNC path, any backup functionality that requires actual installation of binaries on client system would not be present. This currently includes Block Based Backup and snapshot management.

Workflow#2

WMI cannot be used to transfer files to a client and a creation of a share on a client is considered a security risk and cannot be allowed. However, WMI can be used to create a remote process—execute setup.exe in unattended mode from NWclient (residing on a share presented by NW server). This removes the limitation of workflow#1, but does result in a full NW client footprint on the target system and also cannot be used on-the-fly due to large packet transfers and installer process.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for backup client management, comprising:
an input interface configured to receive an indication of a client system; and
a processor configured to:
provide to the client system an indication of authentication for remote command execution, wherein the indication of authentication is received from an authentication server;
determine whether the client system is configured for backup;
in the event the client system is not configured for backup:
provide a first command to the client system to retrieve an installer; and
provide a second command to the client system to execute the installer to configure the client system for backup; and
in the event the client system is configured for backup, provide a backup command to the client system to execute a backup client agent.

2. The system of claim 1, wherein the first command or the second command is provided to the client using Windows Management Instrumentation (WMI).

3. The system of claim 1, wherein executing the installer comprises installing the backup client agent on the client system.

4. The system of claim 1, wherein retrieving the installer comprises downloading the installer to the client system and storing the installer accessible to the client system.

5. The system of claim 4, wherein downloading the installer comprises downloading the installer from a backup server system.

6. The system of claim 1, wherein executing a backup client agent comprises starting a backup process.

7. The system of claim 1, wherein the input interface is further configured to receive an indication of authentication from an authentication server.

8. The system of claim 7, wherein the indication of authentication for remote command execution provided to the client system comprises the indication of authentication received from the authentication server.

9. The system of claim 7, wherein the indication of authentication received from an authentication server comprises a Kerberos ticket.

10. The system of claim 1, wherein the indication of authentication for remote command execution provided to the client system comprises a username and a password.

11. The system of claim 1, wherein the installer retrieves the backup client agent and stores the backup client agent.

12. The system of claim 1, wherein the processor is further configured to provide a command to the client to list a set of available backup commands.

13. The system of claim 12, wherein the set of available backup commands comprises one or more of the following: start a backup, schedule a backup, show a backup, start a recovery, schedule a recovery, show a recovery, show available backups for recovery, and show a backup software version.

14. The system of claim 1, wherein the processor is further configured to provide a command to the client system to disconnect from a backup server after a backup process is complete.

15. The system of claim 1, wherein the processor is further configured to determine whether to install a backup client agent.

16. The system of claim 1, wherein the processor is further configured to determine if the client system has an appropriate version of the backup client agent installed.

17. A method for backup client management, comprising:
receiving an indication of a client system;
providing, using a processor, to the client system an indication of authentication for remote command execution, wherein the indication of authentication is received;
determining whether the client system is configured for backup;
in the event the client system is not configured for backup:
providing a first command to the client system to retrieve an installer; and
providing a second command to the client system to execute the installer to configure the client system for backup; and in the event the client system is configured for backup, provide a backup command to the client system to execute a backup client agent.

18. The method of claim 17, further comprising providing a third command to the client system causing the client system to disconnect from a backup server after a backup process is complete.

19. A computer program product for backup client management, the computer program product being embodied in a non-transitory computer readable storage medium and comprising computer instructions for:
receiving an indication of a client system;
providing to the client system an indication of authentication for remote command execution, wherein the indication of authentication is received from an authentication server;
determining whether the client system is configured for backup;
in the event the client system is not configured for backup:
providing a first command to the client system to retrieve an installer; and
providing a second command to the client system to execute the installer to configure the client system for backup; and
in the event the client system is configured for backup, provide a backup command to the client system to execute a backup client agent.

20. The computer program product of claim 19, further comprising providing a third command to the client system causing the client system to disconnect from a backup server after a backup process is complete.

* * * * *